(12) United States Patent
Agrawal et al.

(10) Patent No.: US 6,651,049 B1
(45) Date of Patent: *Nov. 18, 2003

(54) INTERACTIVE MINING OF MOST INTERESTING RULES

(75) Inventors: Rakesh Agrawal, San Jose, CA (US); Roberto J. Bayardo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/422,661

(22) Filed: Oct. 22, 1999

(51) Int. Cl.$^7$ .............................................. G06F 17/30
(52) U.S. Cl. ................... 707/2; 707/4; 707/6; 707/102; 707/104; 706/1
(58) Field of Search .............................. 707/1–10, 102, 707/104; 706/1

(56) References Cited

U.S. PATENT DOCUMENTS

| | | | | |
|---|---|---|---|---|
| 5,615,341 A | * | 3/1997 | Agrawal et al. ............... | 705/10 |
| 5,899,992 A | * | 5/1999 | Iyer et al. ....................... | 707/7 |
| 5,946,683 A | * | 8/1999 | Rastogi et al. ................. | 707/6 |
| 6,061,682 A | * | 5/2000 | Agrawal et al. ............... | 707/6 |
| 6,078,918 A | * | 6/2000 | Allen et al. .................... | 707/6 |
| 6,138,117 A | * | 10/2000 | Bayardo ........................ | 707/6 |
| 6,173,280 B1 | * | 1/2001 | Ramkumar et al. ............ | 707/6 |
| 6,182,070 B1 | * | 1/2001 | Megiddo et al. ............... | 707/6 |
| 6,230,153 B1 | * | 5/2001 | Howard et al. ................. | 707/2 |
| 6,236,982 B1 | * | 5/2001 | Mahajan et al. ............... | 706/45 |
| 6,272,478 B1 | * | 8/2001 | Obata et al. .................... | 707/6 |
| 6,278,997 B1 | * | 8/2001 | Agrawal et al. ............... | 707/6 |
| 6,278,998 B1 | * | 8/2001 | Ozden et al. ................... | 707/6 |
| 6,327,574 B1 | * | 12/2001 | Kramer et al. ................. | 705/14 |
| 6,532,456 B1 | * | 3/2003 | Wang et al. .................... | 706/48 |
| 2003/0009456 A1 | * | 1/2003 | Shintani et al. ................ | 707/6 |

OTHER PUBLICATIONS

Mining the Most Interesting Rules (Roberto J. Bayardo, Jr. and Rakesh Agrawal) 1999–ACM (p. 145–154).*
Data Mining and the Web: Past, Present and Future (Minos N. Garofalakis, Rajeev Rastogi, S. Seshadri and Kyuseok Shim) 1999–ACM (p. 43–47).*

(List continued on next page.)

*Primary Examiner*—Kim Vu
*Assistant Examiner*—Anh Ly
(74) *Attorney, Agent, or Firm*—McGinn & Gibb, PLLC; Khanh Q. Tran, Esq.

(57) ABSTRACT

A method and structure for identifying database association rules includes mining first database association rules, the first database association rules having ratings with respect to a plurality of metrics, selecting second database association rules from the first database association rules, each of the second database association rules having a highest rating with respect to a different metric of the metrics, and interactively changing the metrics and repeating the selecting to identify most important ones of the databases association rules for a given set of metrics.

23 Claims, 3 Drawing Sheets

OTHER PUBLICATIONS

Mining Association Rules between Sets of Items in Large Databases (Rakesh Agrawal, Tomasz Imielinski & Arun Swami) 1993–ACM SIGMOD.*

Partial Classification Using Association Rules (Kamal Ali, Stefanos Manganaris & Ramakrishnan Srikant) 1997–AAAI.*

Agrawal et al., "Mining Association Rules between Sets of Items in Large Databases", Proceedings of the 1993 ACM-SIGMOD Conference, Washington DC, USA, May 1993.

Bayardo et al., "Constraint–Based Mining in Large, Dense Databases", Proceedings of the 15th International Conference of Data Engineering, 188–197, 1999.

Bayardo, R., "Efficiently Mining Long Patterns from Databases", Proceedings of the 1998 ACM–SIGMOD International Conference on Management of Data, 85–93, 1998.

Rymon, R., "Search through Systematic Set Enumeration", Proceedings KR–92, Cambridge, MA, Oct. 1992.

Bayardo, R., "Brute–Force Mining of High–Conference Classification Rules", Proceedings of the Third International Conference on Knowledge Discovery and Data Mining, 123–126, 1997.

Ali et al., "Partial Classification using Association Rules", Proceedings of the Third International Conference on Knowledge Discovery in Databases and Data Mining, 115–118, 1997.

Srikant et al., "Mining Association Rules with Item Constraints", Proceedings of the Third International Conference on Knowledge Discovery in Databases and Data Mining, 67–73, 1997.

Webb, G., "OPUS: An Efficient Admissible Algorithm for Unordered Search", Journal of Artificial Intelligence Research 3, 431–465, 1995.

Piatetsky–Shapiro, G., "Knowledge Discovery in Databases", 229–248, 1991.

Clark et al., "Rule Induction with CN2: Some Recent Improvements", Machine Learning–Proceedings of the Fifth European Conference (EWSL–91), 151–163, 1991.

Rastogi et al., "Mining Optimized Association Rules with Categorical and Numeric Attributes", 14th International Conference on Data Engineering IEEE, 1998.

Webb, G., "Inclusive pruning: A new class of pruning axiom for unordered search and its application to classification learning", Proceedings of the 1996 Australian Computer Science Conference, 1996.

Fukuda et al., "Data Mining Using Two–Dimensional Optimized Association Rules: Scheme, Algorithms, and Visualization", ACM–SIGMOD, International Conference on Management of Data, Jun. 1996.

Brin et al., "Dynamic Itemset Counting and Implication Rules for Market Basket Data", Proceedings of the 1997 ACM–SIGMOD International Conference on Management of Data, 1997.

Morimoto et al., "Algorithms for Mining Association Rules for Binary Segmentation of Huge Categorical Databases", Proceedings of the 24th VLDB Conference, New York, USA, 1998.

Nayaka et al., "Fast Parallel Search for Correlated Association Rules", Unpublished manuscript, Feb., 1999.

Morishita, S., "On Classification and Regression", Proceedings of the 1st International Conference on Discovery Science, 1998.

* cited by examiner

INTERACTIVE MINING OF MOST INTERESTING RULES

BACKGROUND OF THE INVENTION

1. Field of the Invention

The present invention generally relates to mining database association rules, and more particularly to an interactive process of mining the most important database association rules.

2. Description of the Related Art

A data-set is a finite set of records. In the present invention, a record is simply an element on which boolean predicates (e.g., conditions) are applied. A rule consists of two conditions (e.g., antecedent and consequent) and is denoted as A→C where A is the antecedent and C is the consequent. A rule constraint is a boolean predicate on a rule. Given a set of constraints N, it is said that a rule r satisfies the constraints in N if every constraint in N evaluates to true given r. Some common examples of constraints are item constraints and minimums on support and confidence (e.g., see Srikant et al., 1997, Mining Association Rules With Item Constraints, In *Proceedings of the Third International Conference On Knowledge Discovery in Databases and Data Mining*, 67–73; Agrawal et al. 1993, Mining Associations between Sets of Items in Massive Databases. In *Proceedings of the 1993 ACM-SIGMOD International Conference on Management of Data*, 207–216, all incorporated herein by reference). The input to the problem of mining optimized rules is a 5-tuple <U, D, ≦, C, N>, where U is a finite set of conditions, D is a data-set, ≦ is a total order on rules, C is a condition specifying the rule consequent, and N is a set of constraints on rules.

For example, as discussed in Agrawal el al. 1993, Supra, using a supermarket with a large collection of items as an example, typical business decisions that the management of the supermarket has to make include what to put on sale, how to design coupons, how to place merchandise on shelves in order to maximize the profit, etc. Analysis of past transaction data is a commonly used approach in order to improve the quality of such decisions. Until recently, however, only global data about the cumulative sales during some time period (a day, a week, a month, etc.) was available on the computer. Progress in bar-code technology has made it possible to store the so called basket data that stores items purchased on a per-transaction basis. Basket data type transactions do not necessarily consist of items bought together at the same point of time. It may consist of items bought by a customer over a period of time. Examples include monthly purchases by members of a book club or a music club.

Several organizations have collected massive amounts of such data. These data sets are usually stored on tertiary storage and are very slowly migrating to database systems. One of the main reasons for the limited success of database systems in this area is that conventional database systems do not provide the necessary functionality for a user interested in taking advantage of this information.

Thus, the large collection of basket data type transactions are mined for association rules between sets of items with some minimum specified confidence. An example of such an association rule is the statement that 90% of transactions that purchase bread and butter also purchase milk. The antecedent of this rule consists of bread and butter and the consequent consists of milk alone. The number 90% is the confidence factor of the rule.

Rule mining enhances databases with functionalities to process queries such as finding all rules that have a specific product as consequent (these rules may help plan what the store should do to boost the sale of the specific product), or may help shelf planning by determining if the sale of items on shelf A is related to the sale of items on shelf B), and finding the best rule that has "bagels" in the consequent ("best" can be formulated in terms of the confidence factors of the rules, or in terms of their support, i.e., the fraction of transactions satisfying the rule).

For, example, let $I=I_1, I_2, \ldots, I_m$ be a set of binary attributes, called items. Let T be a database of transactions. Each transaction t is represented as a binary vector, with $t[k]=1$ if t bought the item $I_k$, and $t[k]=0$ otherwise. There is one tuple in the database for each transaction. Let X be a set of some items in I. We say that a transaction t satisfies X if for all items $I_k$ in X, $t[k]=1$.

An association rule has an implication of the form $X \rightarrow I_j$, where X is a set of some items in I, and $T_j$ is a single item in I that is not present in X. The rule $X \rightarrow I_j$ is satisfied in the set of transactions T with the confidence factor $0 \leq c \leq I$ if at least c % of transactions in T that satisfy X also satisfy $I_j$. The notation $X \rightarrow y\ I_j|c$ is used to specify that the rule $X=I_j$ has a confidence factor of c.

Given the set of transactions T, the conventional process is interested in generating all rules that satisfy certain additional constraints of two different forms. The first form is syntactic constraints. These constraints involve restrictions oil items that can appear in a rule. For example, the only interesting rules may be the rules that have a specific item $I_x$ appearing in the consequent. Combinations of the above constraints are also possible, and all rules that have items from some predefined itemset X appearing in the consequent, and items from some other itemset Y appearing in the antecedent may be requested.

The second form is support constraints. These constraints concern the number of transactions in T that support a rule. The support for a rule is defined to be the fraction of transactions in T that satisfy the union of items in the consequent and antecedent of the rule.

Support should not be confused with confidence. The confidence of a rule is the probability with which the consequent evaluates to true given that the antecedent evaluates to true in the input data-set, which is computed as follows:

$$conf(A \rightarrow C) = \frac{sup(A \rightarrow C)}{sup(A)} \qquad (1)$$

While confidence is a measure of the rule's strength, support corresponds to statistical significance. Besides statistical significance, another motivation for support constraints comes from the fact that usually the only interesting rules are the ones with support above some minimum threshold for business reasons. If the support is not large enough, it means that the rule is not worth consideration or that it is simply less preferred (may be considered later).

When mining an optimal disjunction, a set of conditions $A \subseteq U$ is treated as a condition itself that evaluates to true if and only if one or more of the conditions within A evaluates to true on the given record. For both cases, if A is empty then the set of conditions $A \subseteq U$ always evaluates to true. Algorithms for mining optimal conjunctions and disjunctions differ significantly in their details, but the problem can be formally stated in an identical manner. More specifically, the manner in which the optimized rule mining may be formally stated is finding a set $A_1 \subseteq U$ such that $A_1$ satisfies the input constraints, and there exists no set $A_2 \subseteq U$ such that $A_2$ satisfies the input constraints and $A_1 < A_2$. Algorithms for mining optimal disjunctions typically allow a single fixed conjunctive condition without complications (see Rastogi et al. 1998, Mining Optimized Association Rules with Categorical and Numeric Attributes, In *Proceedings of the 14th International Conference on Data Engineering*, 503–512, incorporated herein by reference).

Any rule $A \rightarrow C$ whose antecedent is a solution to an instance I of the optimized rule mining problem is said to be I-optimal (or just optimal if the instance is clear from the context). For simplicity, a rules antecedents (denoted with A and possibly some subscript) and rules (denoted with and possibly some subscript) are sometimes treated interchangeably since the consequent is always fixed and clear from the context.

The support and confidence values of rules are often used to define rule constraints by bounding them above a pre-specified value known as minsup and minconf respectively (see Agrawal et al., 1996, Fast Discovery of Association Rules, *In Advances in Knowledge Discovery and Data Mining*, AAAI Press, 307–328), and also to define total orders for optimization (see Fukuda et al. 1996, Data Mining Using Two-Dimensional Optimized Association Rules: Scheme, Algorithms, and Visualization. *In Proceedings of the 1996 ACM-SIGMOD International Conference on the Management of Data*, 13–23, incorporated herein reference, and Srikant et al., supra). The support of a condition A is equal to the number of records in the data-set for which A evaluates to true, and this value is denoted as sup(A). The support of a rule $A \rightarrow C$, denoted similarly as sup($A \rightarrow C$), is equal to true. The antecedent support of a rule is the support of its antecedent alone. The confidence of a rule is the probability with which the consequent evaluates to true given that the antecedent evaluates to true in the input data-set, which is computed as follows:

$$conf(A \rightarrow C) = \frac{sup(A \rightarrow C)}{sup(A)} \quad (1)$$

Many previously proposed algorithms for optimized rule mining solve specific restrictions of the optimized rule mining problem. For example, Webb, 1995, OPUS: An Efficient Admissible Algorithm for Unordered Search, *Journal of Artificial Intelligence Research*, 3:431–465 (incorporated herein by reference), provides an algorithm for mining an optimized conjunction under some restrictions. The restrictions are that U contains an existence test for each attribute/value pair appearing in a categorical data-set outside a designated class column, $\leq$orders rules according to their laplace value, and N is empty.

Fukuda et al., supra, provides algorithms for mining an optimized disjunction. The algorithms are such that U contains a membership test for each square of a grid formed by discretizing two pre-specified numerical attributes of a data-set (a record is a member of a square if its attribute values fall within the respective ranges), $\leq$orders rules according to either confidence, antecedent support, or a notion called gain, and N includes minimums on support or confidence, and includes one of several possible "geometry constraints" that restrict the allowed shape formed by the represented set of grid squares.

Rastogi et al., supra look at the problem of mining an optimized disjunction where U includes a membership test for every possible hypercube defined by a pre-specified set of record attributes with either ordered or categorical domains, $\leq$orders rules according to antecedent support or confidence, and N includes minimums on antecedent support or confidence, a maximum k on the number of conditions allowed in the antecedent of a rule, and a requirement that the hypercubes corresponding to the condition of a rule are non-overlapping.

In general, the optimized rule mining problem, whether conjunctive or disjunctive, is NP-hard (see Morishita, S. 1998, On Classification and Regression, *In Proceedings of the First International Conference on Discovery Science—Lecture Notes in Artificial Intelligence* 1532:40–57, incorporated herein by reference). However, features of a specific instance of this problem can often be exploited to achieve tractability. For example, in Fukuda et al., supra, the geometry constraints are used to develop low-order polynominal time algorithms. Even in cases where tractability is not guaranteed, efficient mining in practice has been demonstrated (see Nakaya et al. 1999, Fast Parallel Search for Correlated Association Rules, unpublished manuscript, incorporated herein by reference, Rastogi et al., supra, and Webb 1995, supra). The theoretical contributions in this invention are conjunction/disjunction neutral. However, the conjunctive case is focused on invalidating the practicality of these results through empirical evaluation.

SUMMARY OF THE INVENTION

It is, therefore, an object of the present invention to provide a structure and method for identifying database association rules which includes mining first database association rules, the first database association rules having ratings with respect to a plurality of metrics, selecting second database association rules from the first database association rules, each of the second database association rules having a highest rating with respect to a different metric of the metrics, and interactively changing the metrics and repeating the selecting to identify most important ones of the databases association rules for a given set of metrics. The mining produces a partial order and identifies upper and lower support-confidence borders of the database association rules. All of the database association rules fall within the upper and lower support-confidence borders and only rules at the upper and lower support-confidence borders are optimal rules.

An embodiment of the invention is a method of mining most interesting rules from a database which includes generating a set of maximally general and maximally predictive rules from the database, specifying metrics to a query engine, and selecting most interesting rules from the set of maximally general and maximally predictive rules based on the metrics. The generating produces a partial order of the database association rules and identifies upper and lower support-confidence borders of the database association rules. The set of maximally general and maximally predictive rules fall within the upper and lower support-confidence borders and only rules at the upper and lower support-confidence borders are optimal rules. The rules are a plurality of optimal rules from different equivalence classes, and comply with a fixed consequent. The metrics include at least one of confidence, support gain, variance, chi-squared value, entropy gain, gini, laplace, lift, and conviction.

Another embodiment of the invention is a process for identifying database association rules which includes mining first database association rules, the first database association rules having ratings with respect to a plurality of metrics, selecting second database association rules from the first database association rules, each of the second database association rules having a highest rating with respect to a different metric of the metrics, interactively changing the metrics and repeating the selecting to identify most important ones of the databases association rules for a given set of metrics. The mining produces a partial order of the database association rules and identifies upper and lower support-confidence borders of the database association rules. The database association rules fall within the upper and lower support-confidence borders and only rules at the upper and lower support-confidence borders are optimal rules. The second database association rules include maximally general and maximally predictive rules from the database and a plurality of optimal rules from different equivalence classes. The first database association rules comply with at least one consequent. The metrics include at least one of confidence, support gain, variance, chi-squared value, entropy gain, gini, laplace, lift, and conviction.

Yet another embodiment of the invention is a system for mining optimal association rules which includes an engine mining first database association rules (the first database association rules having ratings with respect to a plurality of metrics) and a query engine selecting second database association rules from the first database association rules. Each of the second database association rules has a highest rating with respect to a different metric of the metrics. The query engine interactively changes the metrics and identifies the most important ones of the databases association rules for a given set of metrics. The query engine produces a partial order of the database association rules and identifies upper and lower support-confidence borders of the database association rules. The database association rules fall within the upper and lower support-confidence borders and only rules at the upper and lower support-confidence borders are optimal rules. The second database association rules include maximally general and maximally predictive rules from the database and a plurality of optimal rules from different equivalence classes. The first database association rules comply with a fixed consequent. The metrics include at least one of confidence, support gain, variance, chi-squared value, entropy gain, gini, laplace, lift, and conviction.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS OF THE INVENTION

Figure 1:
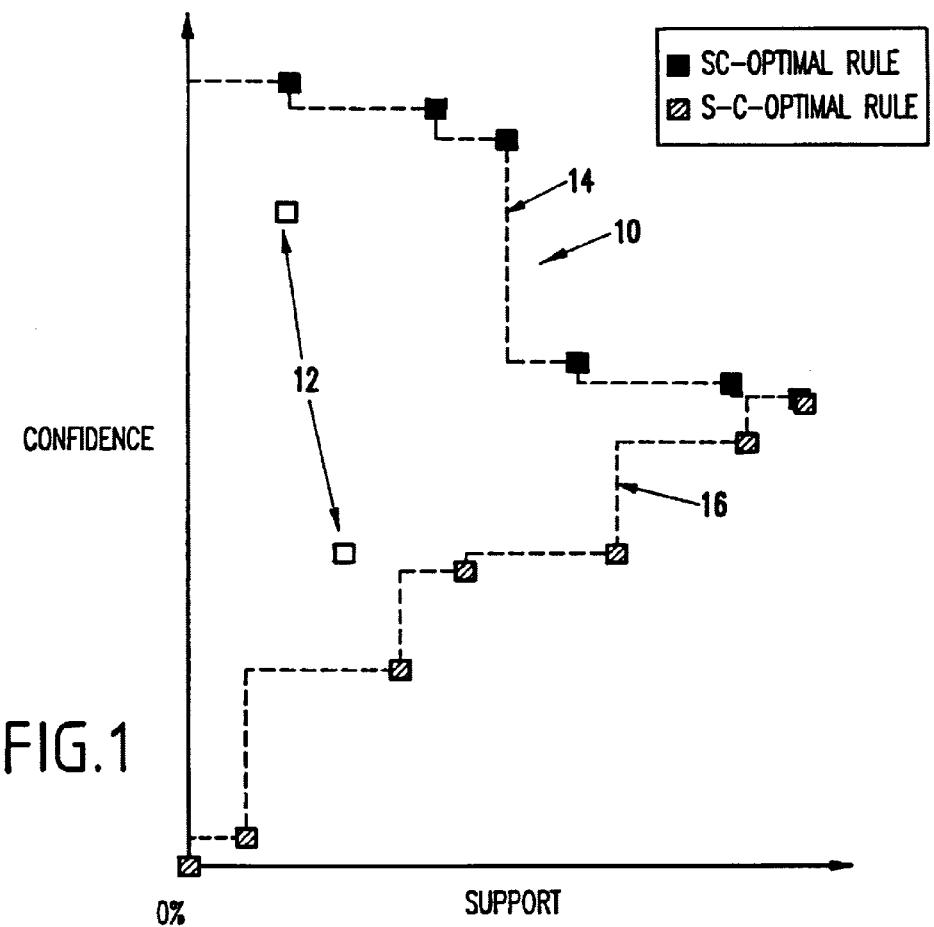
FIG. 1 is a schematic diagram of the upper and lower support-confidence borders.

With the invention, a class of rules is defined which contains a most-interesting rule according to any of the following metrics: confidence and support (see Agrawal et al. 1993, supra), gain (see Fukuda et al., supra), variance and chi-squared value (see Morishita, supra and Nakaya et al., supra), entropy gain (see Morimoto et al. 1998, Algorithms for Mining Association Rules for Binary Segmentations of Huge Categorical Databases. *In Proceedings of the 24th Very Large Data Bases Conference,* 380–391, incorporated herein by reference), gini (see Morimoto et al., supra), laplace (see Clark et al. 1991, Rule Induction with CN2: Some Recent Improvements, *In Machine Learning: Proceedings of the Fifth European Conference,* 151–163, incorporated herein by reference, and Webb 1995, supra), lift (see International Business Machines, 1996, *IBM Intelligent Miner User's Guide,* Version 1, Release 1, (a.k.a. interest, Brin et al. 1997, Dynamic Itemset Counting and Implication Rules for Market Basket Data, *In Proceedings of the 1997ACM-SIGMOD International Conference on the Management of Data,* 255–264, incorporated herein by reference)), and conviction (see Brin et al., supra).

Several algorithms are known to efficiently find the best rule (or a close approximation to the best rule, Morimoto et al., supra) according to a specific one of these metrics (see Fukuda et al., supra, Nakaya et al., supra, Rastogi et al., supra, and Webb 1995, supra). These algorithms do not allow a user to browse interesting rules according to differing definitions. However, with the invention, mining the class of talcs, interactive exploration of most-interesting rules becomes possible since additional database mining is not required after this class of rules is identified.

Returning again to the grocery store example used above, the invention mines the grocery stores database to find equivalence classes of optimized rules which resulted from a specific consequent (e.g., the purchase of bread). This produces association rules which would most likely result in the purchase of bread. The rules can then be browsed using various metrics to find optimized rules associated with the metrics. For example, one metric may produce an optimal rule which indicates that the sale of peanut butter and potato chips are most likely associated with the purchase of bread. Each time a new consequent is to be studied, the database must be re-mined. However, with the invention, the metrics can be repeatedly changed without having to re-mine the database, which increases efficiency dramatically.

The class of rules proposed by the invention uses a partial order on rules defined in terms of both rule support and confidence. The invention identifies those rules that are optimal according to this partial order. This set of rules includes all rules that are best according to any of the above metrics, even given arbitrary minimums on support and/or confidence. Intuitively, this set of optimal rules can be thought of as the set of rules that are maximally general and maximally predictive. Confidence is a predictiveness measure. The higher confidence is, the more predictive the rule is. Support is a generality measure. The higher the support, the more generally applicable the rule is. By optimizing according to the support and confidence partial order, all maximally predictive rules for any given level of generality, and vice versa, are found. Put more succinctly, the invention finds all maximally general and maximally predictive rules.

In the context of mining conjunctive association rules, the invention includes an algorithm that can efficiently mine this class of maximally general and maximally predictive association rules from a variety of real-world data-sets. In one example, for each of the categorical data-sets from the Irvine machine learning repository (excepting only connect-4), the inventive process requires less than 30 seconds on a 400 Mhz Pentium-II class machine. Specifying constraints such as minimum support or confidence reduces execution time even further. While optimizing according to only a single interestingness metric could sometimes require less execution time, the invention is advantageous since it supports an interactive phase in which the user can browse the optimal rule according to any of several interestingness metrics. It also allows the user to interactively tweak minimums on support and confidence. Such effects can be achieved with a conventional optimized rule miner only with repeated mining runs, which may be impractical when the database is large. Because data-mining is iterative and discovery-driven, identifying several good rules up-front allows the invention to avoid repeatedly querying the database which reduces total mining time when amortized over the entire process.

The inventive optimized rule miming problem has been carefully phrased to produce a partial order in place of a total order. With a partial order, because some rules may be incomparable, there can be several equivalence classes containing optimal rules. The conventional systems identify only a single rule from these equivalence classes. However, the invention mines at least one representative rule from each equivalence class that contains an optimal rule. To accomplish this, the conventional problem statement could be simply modified to find all optimal rules for a given consequent instead of just one. However, in practice, the equivalence classes of rules can be large, which would make such a procedure unnecessarily inefficient.

The inventive partial-order optimized rule mining problem statement finds a set O of subsets of U such that every set A in O is optimal, as defined by the optimized rule mining problem and, for every equivalence class of rules as defined by the partial order, if the equivalence class contains an optimal rule, then exactly one member of this equivalence class is within O. A set of rules whose antecedents comprise a solution to an instance I of this problem is called an I-optimal set. An I-optimal rule is one that may appear in an I-optimal set.

Throughout this application, (anti-) monotonicity properties of functions are exploited. A function $f(x)$ is said to monotone (resp. anti-monotone) in x if $x_1 < x_2$ implies that $f(x_1) \leq f(x_2)$ (resp. $f(x_1) \leq f(x_2)$). For example, the confidence function, which is defined in terms of the rule support and antecedent support, is anti-monotone in antecedent support when the rule support is held fixed.

The intuition behind the inventive support/confidence-optimality is to identify all rules that are maximally general for a given level of predictive accuracy. This notion is formalized below. Consider the following partial order $\leq_{sc}$ on rules. Given rules $r_1$ and $r_2$, $r_1 <_{sc} r_2$ if and only if $sup(r_1) \leq sup(r_2) \wedge conf(r_1) \leq conf(r_2)$, or $sup(r_1) < sup(r_2) \wedge conf(r_1) \leq conf(r_2)$. Additionally, $r_1 =_{sc} r_2$ if and only if $sup(r_1) = sup(r_2)$ and $conf(r_1) = conf(r_2)$.

Referring now to the drawings, and more particularly to FIG. 1, an I-optimal set (where I contains this partial order) is depicted. Intuitively, such a set of rules defines a support-confidence border above which no rule that satisfies the input constraints can fall 10. In FIG. 1, no rules fall outside the support/confidence border 10 and the rules 12 which fall within the border 10 are non-optimal rules. Consider also the similar partial order $\leq_{s-c}$ such that $r_1 <_{s-c} r_2$ if and only if $sup(r_1) \leq sup(r_2) \wedge conf(r_1) > conf(r_2)$, or $sup(r_1) < sup(r_2) \wedge conf(r_1) \leq conf(r_2)$. The equivalence condition is the same as before. An optimal set of rules according to this partial order forms a lower support/confidence border.

For many total orders, where $\leq_t$ is intended to rank rules in order of interestingness, $r_1 <_{sc} r_2 \rightarrow r_1 \leq_t r_2$, and $r_1 =_{sc} r_2 \rightarrow r_1 =_t r_2$. Any such total order $\leq_t$ is said to be implied by the support/confidence partial order $\leq_{sc}$. This property of a total order is useful due to the fact that given the problem instance I=<U,D,$\leq_t$,C,N>, where $\leq_t$ is implied by $\leq_{sc}$, an I-optimal rule is contained within any $I_{sc}$ optimal set where $I_{sc}$=<U, D,$\leq_{sc}$,C,N>. Thus, given I=<U,D,$\leq_t$,C,N>, an I-optimal rule must reside along the upper support confidence border. For example, consider any rule $r_1$ that is not $I_{sc}$-optimal (for simplicity, the presence of constraints in N will be ignored). Because $r_1$ is non-optimal, there must exist some rule $r_2$ that is optimal such that $r_1 <_{sc} r_2$. But, it is also given that $r_1 \leq_t r_2$ since $\leq_t$ is implied by $\leq_{sc}$. This implies that any non-$I_{sc}$-optimal rule is either non-I-optimal, or is equivalent to some I-optimal rule which resides in an $I_{sc}$-optimal equivalence class. At least one which resides in an $I_{sc}$-optimal equivalence class must therefore contain an I-optimal rule. Further, because $=_t$ is implied by $=_{sc}$, every rule in this equivalence class must be I-optimal. By definition, an $I_{sc}$-optimal set will contain one of these rules.

Mining the upper support/confidence border 14 identifies optimal rules according to several different interestingness metrics. These metrics include support, confidence, conviction, lift, laplace, gain, and an unnamed interest measure proposed by Piatetsky-Shapiro 1991, Discovery, Analysis, and Presentation of Strong Rules, Chapter 13 of Knowledge Discovery in Databases, AAAI/MIT Press, 1991. If the lower border 16 is also mined, metrics such as entropy gain, gini, and chi-squared value are also included. But first, consider that given instance I=(U, D, $\leq_t$, C, N) constraint $n_s$ and/or a minimum confidence constraint $n_c$, an I-optimal rule is contained within any $I_{sc}$=<U, D, $\leq_{sc}$, C, N−{$n_s$, $n_c$}>, which is an additional property of total orders implied by $\leq_{sc}$.

Thus, with the invention, it is possible to mine without minimum support and confidence constraints, and the optimal rule given any setting of these constraints will remain in the mined rule set. This allows the user to witness the effects of modifying these constraints without further mining of the data (which is very useful because the user often cannot determine accurate settings of minimum support or confidence apriori). Minimum support and confidence restraints are quite critical in some applications of optimized rule mining, particularly when the optimization metric is itself support or confidence as in Fukuda et al., supra, and Rastogi et al., supra.

To identify the interestingness metrics that are implied by $\leq_{sc}$, the following conditions are sufficient for establishing that a total order $\leq_t$ defined over a rule value function $f(r)$ implied by partial order $\leq_{sc}$−$f(r)$ is monotone in support over rules with the same confidence, and $f(r)$ is monotone in confidence over rules with the same support. Suppose $r_1 <_{sc} r_2$, then consider a rule r where $sup(r_1)=sup(r)$ and $conf(r_2)=conf(r)$. By definition $r_1 <_{sc} r$ and $r \leq_{sc} r_2$. If a total order has the monotonicity properties from above, then $r_1 \leq_t r$ and $r \leq_t r_2$. Since total orders are transitive, then $r_1 \leq_t r_2$.

These conditions trivially hold when the rule value function is $sup(r)$ or $conf(r)$. So, consider the Laplace function which is commonly used to rank rules for classification purposes, Clark et al., supra, and Webb 1995, supra.

$$laplace(A \rightarrow C) = \frac{sup(A \rightarrow C) + 1}{sup(A) + k} \quad (2)$$

The constant k is an integer greater than 1 (usually set to the number of classes when building a classification model). If confidence is held fixed to some value c, then the Laplace value can be rewritten as seen below.

$$laplace(r) = \frac{sup(r)+1}{sup(r)/c+k} \quad (3)$$

It is straightforward to show that this expression is monotone in rule support since k>1 and c≦0. The Laplace function is also monotone in confidence among rules with equivalent support. If support is held constant, in order to raise the function value, the denominator value needs to be decreased. This decrease can only be achieved by reducing antecedent support, which implies a larger confidence. An optimal set contains the optimized Laplace rule for any valid setting of k. Thus, with the invention, the user can witness the effect of varying k on the optimal rule without additional mining of the database.

$$gain(A \to C) = sup(A \to C) - \theta \times sup(A) \quad (4)$$

The gain function of Fukuda et al., supra is given above, where θ is a fractional constant between 0 and 1. If confidence is held fixed at c, then this function is equal to sup(r)(1−Θ/c), which is trivially monotone in support as long as c ≦Θ. The case where c<Θ can be ignored if it is assumed there exists any rule r satisfying the input constraints such that conf(r)≦Θ. This is because for any pair of rules $r_1$ and $r_2$ such that conf($r_1$)≦Θ and conf($r_2$)<Θ, it is known that gain($r_1$)≦gain($r_2$) irrespective of their support. Should this assumption be false, the gain criteria is optimized by any rule with zero support should one exist (e.g, in the conjunctive case, one can simply add conditions to a rule until its support drops to zero).

The gain function is monotone in confidence among rules with equivalent support for reasons similar to the case of the Laplace function. If support is held constant, then an increase in gain implies a decrease in the subtractive term. The subtractive term can be decreased only by reducing antecedent support, which implies a larger confidence. Like k from the Laplace function, after identifying the optimal set of rules, the user can vary θ and view its effect on the optimal rule without additional mining. Another interestingness metric that is identical to gain for a fixed value of Θ=sup(C)/|D| was introduced by Piatetsky-Shapiro, supra:

$$ps(A \to C) = sup(A \to C) - \frac{sup(A)sup(C)}{|D|} \quad (5)$$

Conviction (see Brin et al., supra) was framed in Bayardo et al. 1999, Constraint-Based Rule Mining in Large, Dense Databases, *In Proceedings of the 15th International Conference on Data Engineering*, 188–197, as a function of confidence, where $$conviction(A \to C) = \frac{|D| - sup(C)}{|D|(1 - conf(A \to C))} \quad (6)$$

Conviction is obviously monotone in confidence since confidence appears in a subtractive term within the denominator. It is also unaffected by variations in rule support if confidence is held constant, which implies monotonicity.

Lift, a well-know statistical measure that can be used to rank rules in IBM's Intelligent Miner (it is also known as interest Brin et al., supra), can also be framed as a function of confidence (see Bayardo et al. 1999, supra):

$$lift(A \to C) = \frac{|D|conf(A \to C)}{sup(C)} \quad (7)$$

Like conviction, lift is obviously monotone in confidence and unaffected by rule support when confidence is held fixed.

The remaining interestingness metrics, entropy gain, gini, and chi-squared value, are not implied by $\leq_{sc}$. However, it is shown that the space of rules can be partitioned into two sets according to confidence such that when restricted to rules in one set, each metric is implied by $\leq_{s-c}$. As a consequence, the optimal rules with respect to entropy gain, gini, and chi-squared value must reside on either the upper or lower support confidence border. This idea is formally stated by the following observation. Given instance I=<U, D, $\leq_f$, C, N>, if $\leq_{sc}$ implies $\leq_t$ over the set of rules whose confidence is greater than or equal to some value γ, and $\leq_{s-c}$ implies $\leq_t$ over the set of rules whose confidence is less than or equal to γ, then an I-optimal rule appears in either any $I_{sc}$ optimal set where $I_{sc}$=<U, D, $\leq_f$, C, N>, or any $I_{s-c}$=<U, D, $\leq_{s-c}$, C, N>. In order to establish that a total order $\leq_t$ defined over a rule value function f(r) is implied by partial order $\leq_{s-c}$, f(r) is monotone in support over rules with the same confidence and is anti-monotone in confidence over rules with the same support.

In Morimoto et al., supra, the chi-squared, entropy gain, and gini values of a rule are each defined in terms of a function f(x,y) where x=sup(A)−sup(A∪C) and y=sup (A∪C) given the rule A→C to which it is applied.

The following are definitions for the gini, entropy gain, and chi-squared rule value functions. For a given condition A, the fraction of records that satisfy the consequent condition C among those that satisfy A as p(A) and the fraction of records that do not satisfy the consequent condition among those that satisfy A as $\bar{p}(A)$ is denoted $$p(A) = \frac{sup(A \to C)}{sup(A)} \text{ and } \bar{p}(A) = \frac{sup(A) - sup(A \to C)}{sup(A)} \quad (8)$$

$$gini(A \to C) = 1 - [p(\emptyset)^2 + \bar{p}(\emptyset)^2] \quad (9)$$
$$-\frac{sup(A)}{|D|}(1 - [p(A)^2 + \bar{p}(A)^2])$$
$$-\frac{sup(\neg A)}{|D|}(1 - [p(\neg A)^2 + \bar{p}(\neg A)^2])$$

$$ent(A \to C) = -[p(\emptyset)\log(p(\emptyset)) + \bar{p}(\emptyset)\log(\bar{p}(\emptyset))] \quad (10)$$
$$-\frac{sup(A)}{|D|}[(p(A)\log(p(A)) + (\bar{p}(A)\log(\bar{p}(A))]$$
$$-\frac{sup(\neg A)}{|D|}[(p(\neg A)\log(p(\neg A)) + (\bar{p}(\neg A)\log(\bar{p}(\neg A))]$$

$$chi^2(A \to C) = \frac{sup(A)[p(A) - p(\emptyset)]^2 - sup(\neg A)[p(\neg A - p(\emptyset)]^2}{p(\emptyset)} \quad (11)$$
$$+ \frac{sup(A)[\bar{p}(A) - \bar{p}(\emptyset)]^2 - sup(\neg A)[\bar{p}(\neg A - \bar{p}(\emptyset)]^2}{\bar{p}(\emptyset)}$$

Since C and D are constant for a given instance of the problem, terms such as p(ø)=sup(C)/|D| are constants. Any of the above variable terms can be expressed as functions of x=sup(A)−sup(A→C) and y=sup(A→C), and hence so can the functions themselves. For example, sup(A)=y+x, sup(¬A)=|D|−(y+x), p(A)=y/(y+x), $\bar{p}$(A)=x/(y+x), and so on.

These functions are further proven to be convex. Another important property of each of these functions is that they reach their minimum at any rule whose confidence is equal to the "expected" confidence (see Morishita, supra). More formally, f(x,y) is minimum when conf(x,y)=c where conf (x,y)=y/(x+y) and c=sup(C)/|D|. In order to prove the claims, two properties of convex functions are that the convexity of a function f(x,y) implies that for an arbitrary dividing point $x_3$, $y_3$ of the line segment between two points $x_1$, $y_1$ and $x_2$, $y_2$, there is max(f($x_1$, $y_1$), f($x_2$, $y_2$))≧f($x_3$, $y_3$)$^4$ and that a convex function over a given region must be continuous at every point of the region's relative interior.

A convex function f(x,y) which is minimum at conf(x, y)=c, f(x,y) is monotone in conf(x,y) for fixed y, so long as conf(x,y)≧c. When y is fixed to a constant Y, conf(x,Y) for conf(x,Y)≧ C represents a horizontal line segment that extends from point conf(x,Y)=c leftward. The value of conf(x,Y) is clearly anti-monotone in x. Because f is also anti-monotone in x in this region as a consequence of its convexity, it follows that f(x,Y) is monotone in conf(x,Y)$^5$.

Figure 2:
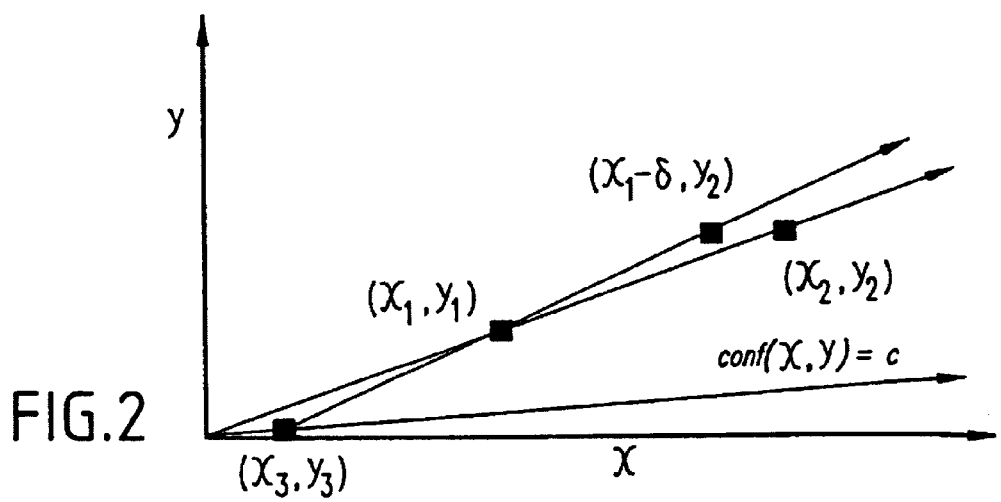
FIG. 2 is an illustration of a function given an expected confidence value.

Referring now to FIG. 2, a convex function f(x,y) is monotone in y when conf(x,y)=A for any constant A≧c. Assuming the claim is false, it is implied there exists a vector v defined by conf(x,y)=A for some constant A≧c along which f is not monotone in y. That is, there exist two points ($x_1$,$y_1$) and ($x_2$,$y_2$) along v where f($x_1$,$y_1$)>f($x_2$,$y_2$) yet $y_1$<$y_2$ (see FIG. 2). If f were defined to be minimum at (0,0), then this would contradict the fact that f is convex. But since f as well as v are undefined at this point, another argument is required. Consider then some sufficiently small non-zero value δ such that x2−δ≧0 and f($x_1$,$y_1$)>f($x_2$−δ,$y_2$) (see FIG. 2). Because f is convex and continuous in its interior region, such a value of δ is guaranteed to exist unless $x_2$=0, which is a trivial boundary case. Now, consider the line [($x_1$,$y_1$), ($x_2$−δ,$y_2$)]. This line must contain a point ($x_3$,$y_3$) such that $x_3$ and $y_3$ are non-negative, and one or both of $x_3$ and $y_3$ is non-zero. But because f is convex and minimum at ($x_3$,$y_3$) it is said that f($x_1$,$y_1$)≦f($x_2$−δ,$y_2$), which is a contradiction.

For a convex function f(x,y) which is minimum at conf (x,y)=c, f(x,y) is anti-monotone in conf(x,y) for fixed y, so long as conf(x,y)≦c, and monotone in y when conf(x,y)=A for any constant A≦c.

The previous information leads immediately to the following theorem, which formalizes the fact that the invention mines the upper and lower support-confidence borders which identifies the optimal rules according to metrics such as entropy gain, gini, and chi-squared value. Conventionally, an algorithm specifically optimized for mining the upper border can be used without modification to mine the lower border by simply negating the consequent of the given instance, as shown below.

Given instance I=(U, D, ≦$_t$, C, N), if ≦$_t$ is defined over the values given by a convex function f(x,y) over rules A→C where x=sup(A)−sup(A∪C) and y=sup(A∪C), and f(x,y) is minimum at conf(x,y)=sup(C)/|D|, then an I-optimal rule appears in either any I$_{sc}$-optimal set where I$_{sc}$=<U, D, ≦$_{sc}$, C, N>, or any I$_{s-c}$-optimal set where I$_{s-c}$=<U, D, ≦$_{s-c}$, C, N>.

Given an instance I$_{s-c}$=<U, D, ≦$_{sc}$, C, N>, any I$_{sc}$-optimal set for I$_{sc}$=<U D, ≦$_{sc}$, ¬C, N> (where ¬C evaluates to true only when C evaluates to false) is also an I$_{s-c}$-optimal set. Conf(A→¬C)=1−conf(A→C). This maximizes the confidence of A→¬C and minimizes the confidence of A→C.

The support confidence borders as displayed in FIG. 1 provide an excellent means by which optimal sets of rules may be visualized. Each border clearly illustrates the trade-off between the support and confidence. Additionally, the result visualizer could include color-coding points along these borders that are optimal according to the various interestingness metrics (e.g., blue for Laplace value, red for chi-squared value, green for entropy gain, etc.). The result of modifying minimum support or confidence on the optimal rules could be displayed in real-time as the user drags a marker along either axis in order to specify a minimum bound.

As mentioned above, one embodiment of the invention efficiently mines an optimal set of conjunctions according to ≦$_{sc}$ (and ≦$_{s-c}$ due to the above) from many real-world categorical data-sets, without requiring that any constraints be specified by the user. Also, with the invention the number of rules produced by this algorithm for a given instance is typically quite manageable, on the order of a few hundred at most. The specific problem is mining optimal conjunctions within categorically valued data, where each condition in U is simply a test of whether the given input record contains a particular attribute/value pair, excluding values from a designated class column. Values from the designated class column are used as consequents. While the invention requires no minimums on support or confidence, if they are specified, they can be exploited for better performance.

This aspect of the invention is a variant of Dense-Miner from Bayardo et al. 1999, supra, which is a constraint based rule miner suitable for use on large and dense data-sets. In Dense-Miner, the rule mining problem is framed as a set-enumeration tree search problem (see Rymon 1992, Search through Systematic Set Enumeration. *In Proceedings of Third International Conference on Principles of Knowledge Representation and Reasoning*, 539–550), where each node of the tree enumerates a unique element of $2^U$. Dense-Miner returns every rule that satisfies the input constraints, which include minimum support and confidence. With the invention, Dense-Miner was modified to instead maintain only the set of rules R that are potentially optimal at any given point during its execution. With the invention, whenever a rule r is enumerated by a node and found to satisfy the input constraints, it is compared against every rule presently in R. If r is better than or incomparable to every rule already in R according to the partial order, then rule r is added to R. Also, any rule in R that is worse than r is removed. Given this policy, assuming the tree enumerates every subset of U, upon termination, R is an optimal set.

Because a system which enumerates every subset would be unacceptably inefficient, pruning strategies that greatly reduce the search space without compromising completeness are used. These strategies use Dense-Miner's pruning functions, which bound the confidence and support of any rule that can be enumerated by a descendent of a given node. To see how these functions are applied in a variant of the algorithm, a node g with support bound s and confidence bound c is considered. To see if g can be pruned, the invention determines if there exists a rule r in R such that $r_i$≦$_{sc}$r, where $r_i$ is some imaginary rule with support s and confidence c. Given such a rule, then g must be equivalent to r. This equivalence class is already represented in R, so there is no need to enumerate these descendants, and g can be pruned.

The invention differs from Dense-Miner in two additional ways. First, the algorithm is allowed to perform a set-oriented best-first search of the tree instead of a purely breadth-first search. Dense-Miner uses a breadth-first search to limit the number of database passes required to the height of the search tree. In the context of optimized rule mining, a breadth-first strategy can be inefficient because pruning improves as better rules are found, and good rules sometimes arise only at deeper levels. A pure best-first search requires a database pass for each node in the tree, which would be unacceptable for large data-sets. Instead, several of the best nodes are processed (5000 at most in one example) with each database pass in order to reduce the number of database passes while still substantially reducing the search space. For this purpose, a node is better than another if the rule it enumerates has a higher confidence value.

The remaining modification of Dense-Miner the incorporation of inclusive pruning as proposed by Webb 1996, Inclusive Pruning: A New Class of Pruning Axiom for Unordered Search and its Application to Classification Learning, *In Proceedings of the* 1996 *Australian Computer Science Conference,* 1–10. This pruning strategy avoids enumerating a rule when it can be determined that its antecedent can be extended with an additional condition without affecting the support of the rule. In the absence of item constraints, this optimization prunes many rules that are either non-optimal or equivalent to some other optimal rule to be enumerated. Unfortunately, when there are item constraints in N, (e.g., "rules must contain fewer than k conditions"), this pruning strategy cannot be trivially applied without compromising completeness, so in on embodiment this pruning strategy is preferably disabled.

Figure 3:
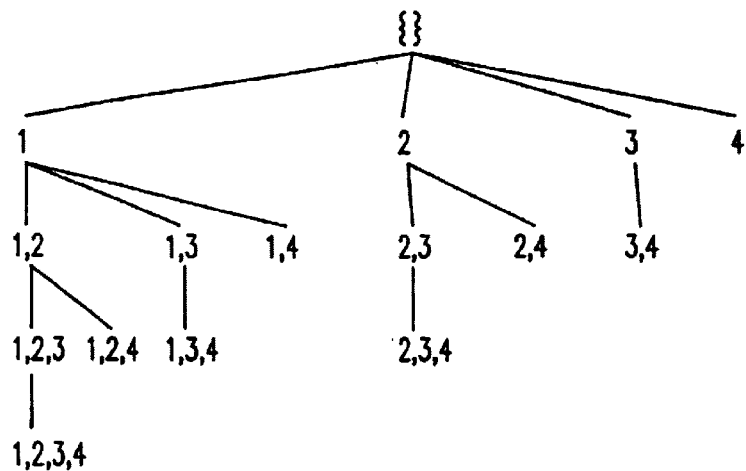
FIG. 3 is a schematic diagram of a complete set-enumeration tree over a four item set.

The set enumeration tree search framework is a systematic and complete tree expansion procedure for searching through the power set of a given set U. The idea is to impose a total order on the elements of U. The root node of the tree will enumerate those sets that can be formed by appending a single element of U to N, with the restriction that this single element must follow every element already in N according to the total order. For example, a fully-expanded set-enumeration tree over a set of four elements 1–4 (where each element of the set is denoted by its position in the ordering) appears in FIG. 3.

To facilitate pruning, a node representation called a group is used. The set enumerated by a node g is called the head and denoted h(g). The set of viable elements of U which can be appended to h(g) in order to form a child is called the tail and denoted t(g). Making the tail elements explicit enables optimizations such as element reordering (for dynamic tee rearrangement) and tail pruning. Element reordering involves locally changing the total order on U at each node in the tree to maximize pruning effectiveness. Tail pruning involves removing elements from the tail if they cannot possibly be part of any solution in the sub-tree rooted at the node. This directly reduces the search space, and indirectly reduces the search space by improving the bounds computed on values such as the confidence of any rule that can be enumerated by a descendent of the node.

It is said that rule r (which is represented using only its antecedent since the consequent it fixed) is derivable from a group g if h(g) ⊂ r, and r ⊆ h(g)∪t(g). By definition, any rule that can be enumerated by a descendent of g in the set-enumeration tree is also derivable from g. As shown in Bayardo et al. 1999, supra, the function $f_c(x,y)=x/(x+)$ provides an upper-bound on the confidence of any conjunctive rule derivable from a given group g, where x and y are non-negative integers such that y≦sup(h(g)∪t(g)→¬C) and x≧sup(h(g)→C), and this value provides an upper-bound on support as well.

The inclusive pruning strategy in Webb 1996, supra, Inclusive Pruning: A New Class of Pruning Axiom for Unordered Search and its Application to Classification Learning, *In Proceedings of the* 1996 *Australian Computer Science Conference,* 1–10, moves a subset T of the tail of a group g into its head whenever some solution is derivable from g, and at least one of the solutions derivable from g is a superset of T. For example, in the case of mining optimized conjunctions according to the Laplace function (and many of the other metrics examined, including partial orders), suppose sup(h(g)→C)=sup(h(g)∪{u}→C) for some element u in t(g). Ignoring the effects of rule constraints, if some rule r derivable from g is optimal, then so is the rule r∪{u}, which is also derivable from g. If one or more such elements are found in the tail of some node, instead of expanding its children, these elements can all be moved into the head to form a new node that replaces it.

Some constraints may unfortunately prohibit straightforward application of this particular inclusive pruning strategy. For example, an item constraint may disallow u from participating in a solution when combined with some other items from h(g) and t(g). Another problematic constraint is one which bounds the size of a rule's antecedent. Luckily, work-arounds are typically possible. For example, in the case where abound k is specified on the number of base conditions that may appear in an antecedent, the strategy can be applied safely whenever |h(g)∪t(g)|≦k.

The invention was evaluated on the larger of the categorical data-sets from the Irvine machine learning database repository, including chess, mushroom, letter, connect-4, and dna. The pums data-set form, Bayardo et al. 1999, supra, which is compiled from census data (a similar data-set was used in Brin et al., supra) was also used. For the Irvine data-sets, each value of the designated class column was used as the consequents. For the pums data-set, the values of RELAT1 column (13 in all) were used. Each of these data-sets is know to be difficult for constraint-based rule mining algorithms such as Apriori, even when specifying a strong minimum support constraint (see Bayardo, R. J. 1997, Brute-Force Mining of High-Confidence Classification Rules, *In Proceedings of the Third International Conference on Knowledge Discovery and Data Mining,* 123–126, incorporated herein by reference, Bayardo et al. 1999, supra, and Brin et al., supra).

Table 1 illustrates the execution time and the number of rules returned by the invention. Characteristics of each data-set appear in Table 2.

TABLE 1

Execution time and Number of Rules Returned

| Data-Set | Consequent | Time (sec) | # of Rules |
|---|---|---|---|
| chess | win | <1 | 60 |
|  | Nowin | <1 | 41 |
| connect-4 | win | 642 | 216 |
|  | draw | 3066 | 171 |
|  | loss | 1108 | 465 |
| letter | A–Z | 18 | 322 |
| dna | EI | 20 | 9 |
|  | IE | 23 | 15 |
|  | N | <1 | 9 |
| mushroom | poisonous | <1 | 12 |
|  | edible | <1 | 7 |
| pums | 1 | 740 | 324 |
|  | 2 | 204 | 702 |
|  | 3 | 509 | 267 |
|  | 4 | 174 | 152 |
|  | 5 | 46 | 91 |
|  | 6 | 19 | 81 |
|  | 7 | 50 | 183 |
|  | 8 | 270 | 210 |
|  | 9 | 843 | 383 |
|  | 10 | 572 | 424 |
|  | 11 | 88 | 165 |
|  | 12 | 12 | 11 |
|  | 13 | 22 | 102 |

TABLE 2

Number of Rows and Columns in Each Data-Set

| Data-Set | # of Rows | # of Columns |
|---|---|---|
| chess | 3,196 | 37 |
| connect-4 | 67,557 | 43 |
| dna | 3,124 | 61 |
| letter | 20,000 | 17 |
| mushroom | 8,124 | 23 |
| pums | 49,046 | 74 |

For the Irvine data-sets, with the exception of connect-4, the invention identified an optimal set of rules within 30 seconds in every case, with many runs requiring less than 1 second. Connect-4 was the most difficult of the data-sets. In cases like these, modest setting of the minimum support or confidence constraint can be specified prior to mining in order to improve runtime considerably. For example, a minimum support of 676 records (1% of the data-set) reduces execution time to 6 minutes. In cases like these, modest settings of the minimum support or confidence constraint can be used to improve runtime considerably. For example, a minimum support of 676 records (1% of the data-set) reduces execution time to 6 minutes.

Figure 4:
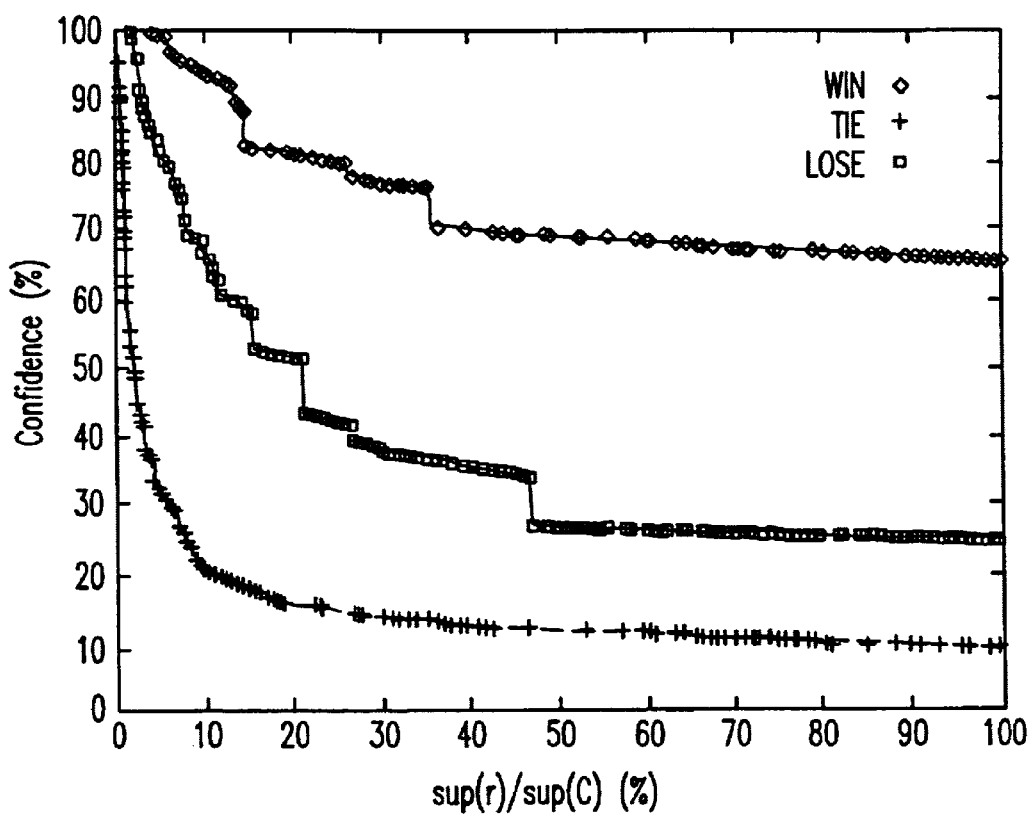
FIG. 4 is a schematic diagram of the upper support/confidence borders for connect-4 data.

The number of rules in each optimal set was on the order of a few hundred at most. Of the Irvine data-sets, connect-4 contained the most optimal rules, with 216 for win, 171 for tie, and 465 for lose. The upper support-confidence border or each of these consequents is plotted as shown in FIG. 4. Rule support is normalized according to consequent support so that each border ranges from 0 to 100% along the x axis while confidence ranges from 0 to 100% along the y axis.

Figure 5:
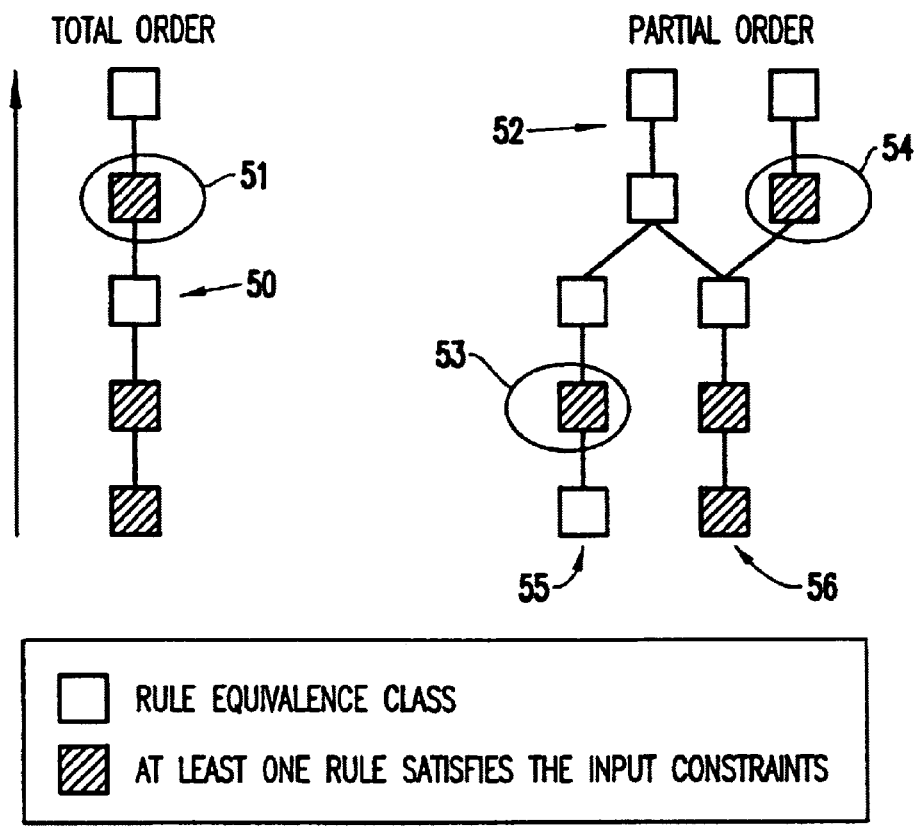
FIG. 5 is a schematic diagram illustrating partial order optimized rule mining versus total order rule mining.

As mentioned above, the invention produces a partial order of rules. This concept is illustrated graphically in FIG. 5. The conventional systems mine a database with fixed consequents to produce a total order 50. The highest rule which satisfies all input constraint 51 is identified as the optimal rule. To the contrary, because the invention mines the database for a broad number of metrics given at least one consequent, a partial order 52 is produced. The highest rule associated with each different equivalent class identified during the mining process is marked as an optimal rules for that given metric. Therefore, the invention identifies multiple optimal rules 53, 54 for the different equivalent classes 55, 56.

Figure 6:
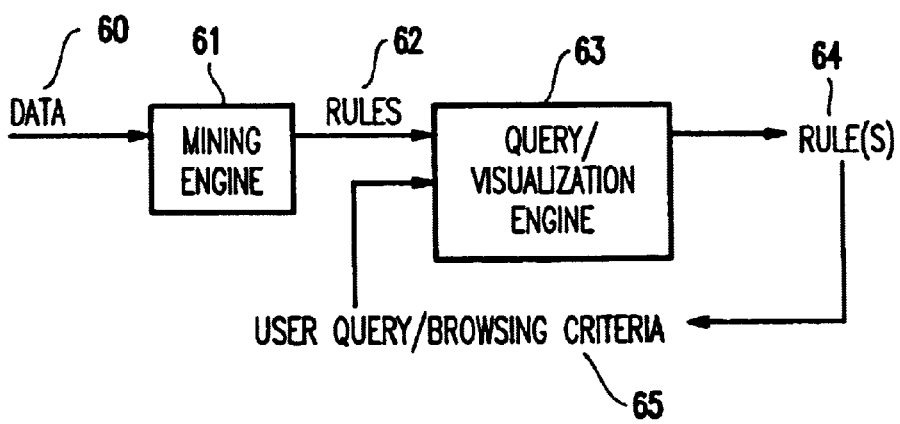
FIG. 6 is a schematic diagram of a computer system for operating the invention.

Thus, as described above, the invention applies a mining engine 61 to data 60 to produce optimal rules 62 which satisfy at least one consequent, as shown in FIG. 6. The optimized rules 62 are subjected to an interactive user query/visualization engine 63 which identifies the optimal rules for a limited number of metrics 64 which comply with the users query/browsing criteria 65. Therefore, as mentioned above, the invention only mines the data 60 with the mining engine 61 a single time, while different browsing criteria (e.g., different metrics) can be repeatedly applied to the optimized rules 62 through the query/visualizations engine 63 to provide different optimized rules 64 for different input metrics. By eliminating the need to re-mine the data 60 each time the interestingness criteria 65 are changed, the invention is substantially more efficient than conventional data mining systems.

Thus, the invention defines a new optimized rule mining system that allows a partial order in place of the typical total order on rules. With the invention, solving this optimized rule mining problem with respect to a particular partial order $\leq_{sc}$ (and in some cases its analog $\leq_{s-c}$) is guaranteed to identify a most-interesting rule according to several interestingness metrics including support, confidence, gain, laplace value, conviction, lift, entropy gain, gini, and chi-squared value. In practice, identifying such an optimal set of conjunctive rules can be done efficiently, and the number of rules in such a set is typically small enough to be easily browsed by an end-user. Lastly, this concept is generalized using another partial order $\leq_{pc}$ in order to ensure that the entire population of interest is well-characterized. This generalization defines a set of rules that contains the most interesting rule according to any of the above metrics, even if one requires this rule to characterize a specific subset of the population of interest.

The invention can be used to facilitate interactivity in the process of mining most-interesting rules. After mining an optimal set of rules according to the first partial order, the user can examine the most-interesting rule according to any of the supported interestingness metrics without additional querying or mining of the database. Minimum support and confidence can also be modified and the effects immediately witnessed. After mining an optimal set of rules according to the second partial order, in addition to the above, the user can quicky find the most-interesting rule that characterizes any given subset of the population of interest. This extension overcomes the deficiency of most optimized rule miners where much of the population of interest may be poorly characterized or completely uncharacterized by the mined rule(s).

While the invention has been described in terms of preferred embodiments, those skilled in the art will recognize that the invention can be practiced with modification within the spirit and scope of the appended claims.

What is claimed is:

1. A method of mining most interesting rules from a database comprising:
   generating a set of maximally general and maximally predictive rules from said database, wherein said maximally general and maximally predictive rules exist at upper and lower support confidence borders of said database association rules;
   specifying metrics to a query engine; and
   selecting most interesting rules from said set of maximally general and maximally predictive rules based on said metrics.

2. The method in claim 1, wherein said generating produces a partial order of said database association rules.

3. The method in claim 1, wherein said generating identifies said upper and lower support-confidence borders of said database association rules.

4. The method in claim 3, wherein said set of maximally general and maximally predictive rules fall within said upper and lower support-confidence borders and only rules at said upper and lower support-confidence borders comprise optimal rules.

5. The method in claim 1, wherein said set of maximally general and maximally predictive rules comprise a plurality of optimal rules from different equivalence classes.

6. The process in claim 1, wherein said set of maximally general and maximally predictive rules comply with a fixed consequent.

7. The process in claim 1, wherein said metrics comprise at least one of confidence, support gain, variance, chi-squared value, entropy gain, gini, laplace, lift, and conviction.

8. A process for identifying database association rules comprising:
   mining first database association rules, said first database association rules having ratings with respect to a plurality of metrics;

selecting second database association rules from said first database association rules, each of said second database association rules having a highest rating with respect to a different metric of said metrics; and interactively changing said metrics and repeating said selecting to identify most important ones of said databases association rules for a given set of metrics.

9. The process in claim 8, wherein said mining produces a partial order of said database association rules.

10. The process in claim 8, wherein said mining identifies upper and lower support-confidence borders of said database association rules.

11. The process in claim 10, wherein said database association rules fall within said upper and lower support-confidence borders and only rules at said upper and lower support-confidence borders comprise optimal rules.

12. The process in claim 8, wherein said second database association rules comprise maximally general and maximally predictive rules from said database.

13. The process in claim 8, wherein said second database association rules comprise a plurality of optimal rules from different equivalence classes.

14. The process in claim 8, wherein said first database association rules comply with a fixed consequent.

15. The process in claim 8, wherein said metrics comprise at least one of confidence, support gain, variance, chi-squared value, entropy gain, gini, laplace, lift, and conviction.

16. A system for mining optimal association rules comprising:

a mining engine mining first database association rules, said first database association rules having ratings with respect to a plurality of metrics; and a query engine selecting second database association rules from said first database association rules, each of said second database association rules having a highest rating with respect to a different metric of said metrics, said query engine interactively changing said metrics and identifying most important ones of said databases association rules for a given set of metrics.

17. The system in claim 16, wherein said query engine produces a partial order of said database association rules.

18. The system in claim 16, wherein said query engine identifies upper and lower support-confidence borders of said database association rules.

19. The system in claim 18, wherein said database association rules fall within said upper and lower support-confidence borders and only rules at said upper and lower support-confidence borders comprise optimal rules.

20. The system in claim 16, wherein said second database association rules comprise maximally general and maximally predictive rules from said database.

21. The system in claim 16, wherein said second database association rules comprise a plurality of optimal rules from different equivalence classes.

22. The system in claim 16, wherein said first database association rules comply with at least one consequent.

23. The system in claim 16, wherein said metrics comprise at least one of confidence, support gain, variance, chi-squared value, entropy gain, gini, laplace, lift, and conviction.

* * * * *